United States Patent [19]

Mayer

[11] 4,191,847

[45] Mar. 4, 1980

[54] CIRCUIT ARRANGEMENT FOR DETERMINING INPUT SIGNALS WHICH EXCEED A GIVEN MINIMUM DURATION, IN PARTICULAR FOR TELEPRINTER EXCHANGES

[75] Inventor: Max Mayer, Unterpfaffenhofen, Fed. Rep. of Germany

[73] Assignee: Siemens Aktiengesellschaft, Berlin & Munich, Fed. Rep. of Germany

[21] Appl. No.: 938,984

[22] Filed: Sep. 1, 1978

[30] Foreign Application Priority Data

Sep. 21, 1977 [DE] Fed. Rep. of Germany ....... 2742525

[51] Int. Cl.² ............................................. H03K 9/08
[52] U.S. Cl. ......................................... 178/3; 328/111
[58] Field of Search ....................... 328/111, 112, 113; 329/106; 325/42; 178/3, 2 R, 69 G

[56] References Cited

U.S. PATENT DOCUMENTS 3,753,135   8/1973   Kastner et al. ...................... 328/111

FOREIGN PATENT DOCUMENTS 2429827   3/1975   Fed. Rep. of Germany ........... 328/111

*Primary Examiner*—Thomas A. Robinson
*Attorney, Agent, or Firm*—Hill, Van Santen, Steadman, Chiara & Simpson

[57] ABSTRACT

In order to determine input signals which exceed a given minimum duration, in particular call signals in teleprinter exchanges, upon occurrence of each input signal a counter for executing a counting operation is enabled, the counter output signal occurring upon reaching a given counter position serving the purpose of enabling a logic element via which communication signals (or characters or indicia) are transmitted. If the input signal which has placed the counter into operation is removed in the course of the counting operation, the counter will again return to its initial position. Through these measures, a simple differentiation of input signals having a given minimum duration and of interference pulses, having a shorter duration than the minimum duration, is possible.

5 Claims, 1 Drawing Figure

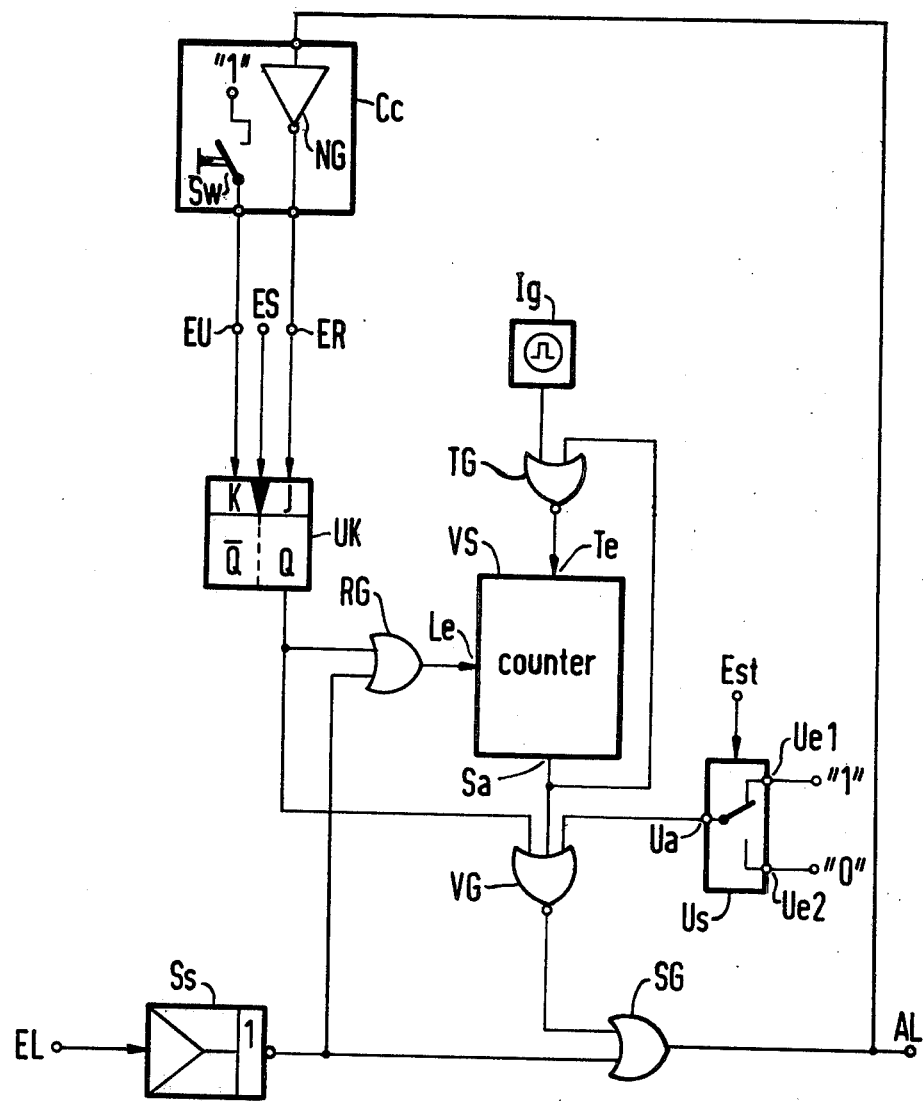

CIRCUIT ARRANGEMENT FOR DETERMINING INPUT SIGNALS WHICH EXCEED A GIVEN MINIMUM DURATION, IN PARTICULAR FOR TELEPRINTER EXCHANGES

BACKGROUND OF THE INVENTION

1. Field of the Invention

The present invention relates to a circuit arrangement for determining input signals which exceed a given minimum duration, in particular call signals governed by a continuous signal in teleprinter exchanges, employing a delay circuit which can be triggered by a relevant input signal and a logic element which is connected by one input to the output of the delay circuit and at the other input receives the relevant input signal, which emits an output signal in the event that the input signal supply to its further input is longer in duration and corresponds to the delay time of the delay circuit.

2. Description of the Prior Art

A circuit is already known in the art for reporting the reductions in loop current, which indicate the beginning of dialing, in telephone exchanges (Austrian AS No. A 50 63/63now Austrian Pat. No. 239,321 of Mar. 25, 1965), wherein the subscriber line is connected to a register and to the base electrode of two transistors, whose parallelconnected emitter electrodes are connected to a capacitor and whose collector electrodes are connected to differently dimensioned load resistors, wherein a measuring device which corresponds to a threshold value is connected to the collector electrode of the transistor connected to the greater load resistor. Although this known circuit arrangement enables reductions in loop current, which indicate the beginning of dialing, to be determined in the relevant subscriber line and an appropriate message signal to be emitted, it does not facilitate a differentiation between beginning-of-dialing signals of this type and interference signals which can likewise lead to a reduction in loop current in the relevant subscriber line. An electronic pulse circuit for suppressing interference pulses which have an interval shorter than the specified interval, while adhering to the pulse trailing edge without delay is also known (German AS No. 1 173 938). In this known pulse circuit, one input of an AND circuit is connected directly via a line, and the second input via an integrator, which represents a delay circuit, to a sampling device. This known pulse circuit only emits an output signal when an output signal with which it has been supplied extends beyond a minimum duration, determined by the dimensioning of the integrator. In this manner, however, all the signals and pulses consecutively fed to the input of the relevant pulse circuit are evaluated. This is undesirable in cases in which it is adequate to simply evaluate the duration of a first signal occurring within a sequence of consecutive signals.

SUMMARY OF THE INVENTION

Accordingly, the object of the present invention is to provide a circuit of the general type mentioned above with which it is possible to easily distinguish input signals having a given minimum duration from comparatively short interference pulses, and, following the recognition of an input signal having a duration which exceeds the given minimum duration, to disregard, in a simple manner, subsequent input signals until the occurrence of a special control signal.

The above object is achieved in a circuit arrangement of the type generally described above, according to the present invention, in that the delay circuit is formed by a counter which is connected by an output via a further logic element to the input of the aforementioned logic element in order to control the signal transmission capacity of the logic element, and that the other input of the further logic element and a counter enabling terminal, which is fed with the relevant input signals, of the counter can each be supplied with control signals which occur in one of two signal states and which in the one state release the counter in order to trigger a counting process upon the occurrence of an input signal, and, via the further logic element, enable the aforementioned logic element to emit signals on the occurrence of a counter output signal, and which in their other signal state bring the counter into its rest state and, via the further logic element, maintain the aforementioned logic element in the transmitting state for incoming input signals. This results in the advantage that, with a relatively low circuit expense, it is possible to distinguish input signals having a predetermined minimum duration from interference pulses which have a shorter duration than the relevant minimum duration, particularly with the first input signal occurring in a sequence of consecutive input signals, and that the input signals which follow the first input signal can be disregarded in respect of differentiation from interference pulses. Consequently, the circuit arrangement corresponding to the present invention is advantageously suitable for use in order to determine call signals in teleprinter exchanges and, in particular, in a known electronic data exchange system EDS which can be attributed to such a system, and in which a call signal occurring as a first input signal is followed by further, possibly comparatively shorter input signals, such as dialing signals, teleprinter signals, etc.

In accordance with an advantageous feature of the invention the control signals are derived from a control circuit which, having determined a first output signal at the output of the aforementioned logic element, emits a corresponding control signal. This provides the advantage of a particularly simple manner for controlling the counter and the aforementioned logic element.

In accordance with another advantageous feature of the invention, the output of the counter is connected to one input of a timing pulse transmission logic element which is connected by the further input to a timing pulse generator, and which only emits timing pulses from its output to a counter input of the counter in the absence of a counter output signal. This results in the advantage that a reliable operation of the circuit arrangement is ensured in a relatively simple manner in the event that the input signals supplied to the circuit arrangement do not require monitoring in respect of duration. On the other hand, the considered measure provides the advantage that through the selection of the pulse train frequency of the timing pulses emitted from the timing pulse generator that is possible, in a relatively simple manner, to determine the aforementioned minimum duration which the input signals which are to be checked must possess in order to allow the emission of output signals and in order not to be evaluated as interference pulses.

In accordance with still another advantageous feature of the invention, the aforementioned further logic element can be supplied at a further input with special enabling signals and disabling signals, respectively. This measure advantageously facilitates a special actuation or de-actuation of the relevant circuit arrangement.

BRIEF DESCRIPTION OF THE DRAWING

Other objects, features and advantages of the invention, its organization, construction and mode of operation will be best understood from the following detailed description, taken in conjunction with the accompanying drawing, on which there is a single FIGURE which is a schematic circuit diagram of an exemplary embodiment of the invention.

DESCRIPTION OF THE PREFERRED EMBODIMENTS

The circuit arrangement illustrated on the drawing fundamentally comprises a counter VS which serves as a delay circuit, an OR gate SG which is referred to above as the first logic element, and a NOR gate VG which is referred to above as the further logic element and which is connected by an input to an output Sa of the counter VS and by its output to an input of the OR gate SG. This OR gate SG, which here fulfills a blocking function, is connected by a further input to the output of an interface circuit Ss by way of which the circuit arrangement illustrated in the drawing is connected to an input line terminal EL. The interface circuit Ss, which is to be provided for matching purposes, will be assumed to contain an amplifier followed by an inverter. The output of the aforementioned OR gate SG is connected to an output line terminal AL. The NOR gate VG is connected by a further input to an output Q of a JK-flip-flop UK which is referred to as a polarity reversal trigger stage. The output Q of the trigger stage UK is also connected to one input of an OR gate RG. The other input of the OR gate RG is connected to the output of the interface circuit Ss. The OR gate RG is connected by its output to a counter enabling input Le of the counter VS. As will also become apparent, the binary state of the signal in each case appearing at the counter enabling input Le of the counter VS determines whether the counter VS is to be reset to its initial count or to be maintained at the end count.

The trigger stage UK is connected by its input J to an input terminal ER, and by its input K is connected to an input terminal EU. The trigger state UK is connected by its pulse train input to an input terminal ES. Control signals which establish the state of the trigger stage UK occur at the input terminals ER, EU and ES. When the relevant circuit arrangement is used in a teleprinter exchange or in the above-mentioned known electronic data exchange system EDS (such as disclosed for example in the magazine "Der Fernmelde-Ingenieur", 26th edition, Vol. 5, May 15, 1972), items of polarity reversal data which are characteristic of letter characters appear at the input terminal EU, whereas polarity restoration data characteristic of the occurrence of digit characters occur at the input terminal ER. Pulse train control pulses for the trigger stage UK occur at the input terminal ES.

In addition to the previously considered counter enabling input Le, the counter VS is also provided with a pulse train input Te which is connected to the output of a NOR gate TG, which is to be referred to as a pulse train logic element. This NOR gate TG is connected by one of its inputs to the output of a timing pulse generator Ig. At its other input, the NOR gate TG is connected to the aforementioned output Sa of the counter VS.

The circuit arrangement illustrated on the drawing also has a special control circuit which has been represented by a transfer switch Us. This transfer switch carries binary continuous signals "1" and "0" at its switch inputs Ue1 and Ue2. The switch output Ua of the transfer switch Us is connected to a further input of the aforementioned NOR gate VG. When appropriate control signals are fed to a control input Est, the transfer switch Us can either emit the binary signal "1" or the binary signal "0" from its output Ua. A binary signal "0" is emitted from the transfer switch Us whenever the circuit arrangement is to be actuated in respect of evaluating duration of input signals with which it is supplied. If the relevant circuit arrangement is to be de-activated in respect of its evaluation function, a binary signal "1" is emitted from the output of the transfer switch Us. As will become apparent in the following, this results in all the input signals fed to the input line terminal EL of the circuit arragement, having been inverted in the interface circuit Ss, being allowed to pass unobstructed via the OR gate SG to the output line terminal AL without the signals being subjected to analysis in respect of their duration in the circuit arrangement.

The explanation of the construction of the circuit arrangement illustrated on the drawing will now be provided, along with a detailed consideration of the mode of operation of the circuit arrangement. It will first of all be assumed that the transfer switch Us emits a binary "0" from its switch output Ua, as a result of which the considered circuit arrangement is enabled in order to analyze the duration of the input signals with which it is supplied. It will also be assumed that the trigger stage UK is set in such a manner that it emits a binary signal "0" from its output Q. Finally, it will be assumed that the input line terminal EL is initially connected to a binary signal "0" which characterizes a start potential occurring in the rest state. This binary signal "0" leads to the emission of a binary signal "1" from the output of the interface circuit Ss. Consequently, this binary signal "1" which is now characteristic of the rest state and of the start potential occurs via the OR gate SG at the output terminal AL, and via the OR gate RG the relevant binary signal "1" is connected to the counter release input Le of the counter VS. The counter VS is erased by this binary signal "1" which is fed to its counter release input Le, i.e. is reset into its starting count. At the starting count, the counter VS emits a binary signal "0" from its output Sa. Since a binary signal "0" is thus present at each of the three inputs of the NOR gate VG, this NOR gate VG emits a binary signal "1" from its output to the OR gate SG. However, this has no further effect as the binary signal "1" has already been supplied to the other input of the OR gate SG. The binary signal "0" occurring at the output Sa of the counter VS causes the NOR gate TG to transmit timing pulses emitted from the timing pulse generator Ig and to feed these timing pulses to the pulse train input Te of the counter VS. The occurrence of the timing pulses a the pulse train input Te of the counter VS initially has no influence upon the counter, as the latter remains in its starting count as a result of the binary signal "1" present at its counter enabling input Le.

If, at the input line terminal EL, there now occurs an input signal which corresponds to a binary signal "1" and which, when the described circuit arrangement is employed in a teleprinter exchange or in the above-mentioned known electronic data exchange system, can be assumed to correspond to a stop signal, the following processes take place. A binary signal "0" now occurs at the output of the interface circuit Ss. As a result, a binary signal "0" is emitted from the output of the OR gate RG to the counter enabling input Le of the counter VS. The counter VS thus starts to count the timing pulses which are supplied to its pulse train input Te. However, the binary signal "0" occurring at the output of the interface circuit Ss has no influence in respect of the emission of the output signal from the OR gate SG as the SG continues to be supplied from the output of the NOR gate VG with a binary signal "1" which, in contrast to the aforementioned binary signal "0", is active and thus occurs at the output terminal AL. For such time as a binary signal "0" occurs at the counter enabling input Le of the counter VS, the counter VS counts the timing pulses with which it is supplied at its pulse train input Te. When the counter VS reaches its end count with a binary signal "0" still present at its counter enabling input Le, a binary output signal "1" occurs at the output Sa of the counter VS. On the one hand, this causes the NOR gate TG to be blocked in respect of the further supply of timing pulses to the pulse train input Te of the counter VS. On the other hand, this causes a binary signal "0" to be emitted from the output of the NOR gate VG. The result is that now, with a binary signal "1" still present at the input line terminal EL, a binary signal "0" is emitted from the OR gate SG to the output line terminal AL. Consequently, a change in polarity from the binary signal "1" to the binary signal "0" has now occurred at the output line terminal AL. This change in polarity from the binary signal "1" to the binary signal "0" at the output line terminal AL can be used to indicate that the first input signal supplied to the circuit arrangement actually possesses a duration which is equal to a given minimum duration. This minimum duraction is governed by the interval of time which passes between the beginning of a counting process and the emission of a counter output signal "1" by the counter VS.

On the occurrence of the first change in polarity from the binary signal "1" to the binary signal "0" at the input line terminal EL when the counter VS has been brought into its end count, the binary signal "1" then occurring at the output of the interface circuit Ss will then return the counter VS into its starting count by operating its counter enabling input Le. Consequently, a binary signal "0" is then emitted from the output Sa of the counter VS and, in combination with the input signals present at the other inputs of the NOR gate VG, would lead to the emission of a binary signal "1" from the output of the NOR gate VG.

However, a control circuit Cc emits a control signal whenever a first output signal has been established at the output of the OR gate SG referred to above as a logic element. It will be noted that on the drawing the input terminals EU and ER of the trigger stage UK are connected to the outputs of the control circuit Cc. This control circuit, in its simplest form, can comprise a switch Sw and an inverter NG. By way of the switch Sw, a binary signal "1" can be connected to the input terminal EU of the trigger stage UK. By way of the inverter NG, the input terminal ER of the trigger stage UK. By way of the inverter NG, the input terminal ER of the trigger stage UK can be connected to the output terminal AL. As explained above, the occurrence of such an output signal can be recognized from the change from the binary signal "1" to the binary signal "0" at the output line terminal AL. When such an output signal is determined, the trigger stage UK illustrated on the drawing is then supplied with a control signal which is such that the trigger stage UK emits a binary signal "1" from its output Q. Consequently, the counter VS is maintained at its starting count and, moreover, its binary signal "0" is emitted from the output of the NOR gate VG. For such time as the trigger stage UK remains in this position, the signals supplied to the input line terminal EL, having been inverted by the interface circuit Ss, but not having been evaluated by the circuit arrangement, are fed to the output line terminal AL.

Not until, through activation of the switch Sw, the aforementioned control circuit has supplied a control signal which reverses the trigger stage UK, is the counter VS able to execute a new counting process upon the occurrence of a binary signal "1" at the input line terminal EL. When the circuit arrangement is used in the aforementioned known electronic data exchange system EDS, a control signal of this type which reverses the trigger stage UK can be emitted when, following the establishment of the regular call signal, the dialing and teleprinter characters have been forwarded. In this association it should be noted that when used in the relevant electronic data exchange system, the circuit arrangement can be inserted in the input circuits of the system terminal circuits arranged therein. The aforementioned control circuit which controls the trigger stage UK can be formed by a transmission flow control unit which follows the aforementioned system terminal circuits in the referenced electronic data exchange system.

In the foregoing it has been assumed that following the enabling of the counter VS for the execution of a counting process, the input signal fed to the input line terminal EL has occurred for a longer duration than corresponds to the counting duration of the counting VS. If, however, the input signal supplied to the input line terminal EL (binary signal "1") disappears during the counting duration of the counter VS and if, instead a binary signal "0" occurs at the input line terminal EL, this results in the counter VS being returned to its starting count, as now its counter enabling input Le is again supplied with a binary signal "1". Therefore, no change occurs at the output line terminal AL. This means that a binary signal "1" continues to be emitted from the output line terminal AL and, in fact, by way of the OR gate SG from the output of the NOR gate VG. In this manner, the circuit arrangement can be used to distinguish interference pulses from input signals which, when occurring with a duration which exceeds a given minimum duration, may trigger control processes in the following processing devices.

With regard to the timing pulse generator Ig which belongs to the circuit arrangement, it should be additionally noted that the pulse repetition frequency of the timing pulses emitted from the timing pulse generator Ig is selected to be such that within the aforementioned given minimum duration the counter VS counts a sufficient number of pulses to emit a binary signal "1" at its output Sa. If the counter VS is designed in such a manner that it emits a binary signal "1" from its output Sa when the count "7" is reached, with a pulse repetition frequency of 100 Hz (this corresponds to a period duration of 10 ms) the counting duration of the counter VS amounts to at least 70 ms (i.e. without a timing error) and at the maximum 80 ms (with a maximum timing error), starting from the occurrence of a binary signal "0" at the counter enabling input Le. As it is necessary to take into consideration the most unfavorable situation in which the timing pulses occur during the evaluation of the duration of the input signals, this means that an input signal which is to be able to trigger control processes would have to possess a minimum duration of 80 ms.

Should it be necessary to use the circuit arrangement to trigger appropriate control processes upon the occurrence of input signals having different minimum durations, the pulse repetition frequency of the timing pulses emitted from the timing pulse generator Ig can be modified accordingly so that the counting duration of the counter VS is always adapted to the particular minimum duration of the output signals which are to be taken into consideration.

Finally, it should be noted that commercially available ciruculit elements can be used to construct the circuit arrangement. In particular, an integrated circuit of the type SN74393 or SN74LS393 can be used for the counter VS.

Although I have described my invention by reference to particular illustrative embodiments thereof, many changes and mofidifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a circuit arrangement for determining whether input signals exceed a predetermined minimum duration, in which a delay circuit is triggered by the relevant input signal and a logic circuit is connected to receive the output signals of the delay circuit and connected to also receive the relevant input signal and emits an output signal in response to the duration of the input signal being at least equal to the time delay of the delay circuit, the improvement in combination therewith wherein said delay circuit comprises a counter including first and second inputs for receiving input control signals and counting signals, respectively, and an output;

and further comprising another logic circuit including a first input connected to said output of said counter, a second input for receiving control signals and an output connected to the first-mentioned logic circuit; and control signal means providing first and second control signals, said control signal means including a first input connected to the output of the first-mentioned logic circuit, a second input for receiving the relevant input signal, and an output connected to said first input of said counter and to said second input of said other logic circuit and operable to provide said first control signal to release said counter to count in response to receipt of a first input signal and drive the first-mentioned logic circuit via said other logic circuit to produce an output signal upon reaching a predetermined count, and operable to provide said second control signal to maintain said counter in its rest condition so that the first-mentioned logic circuit remains in a transmissive state for incoming input signals.

2. The improved circuit arrangement of claim 1, wherein said control signal means comprises a bistable circuit including an output connected to said second input of said other logic circuit and to said first input of said counter, and an input connected to the output of the first-mentioned logic circuit.

3. The improved circuit arrangement of claim 1, and further comprising:

a timing pulse generator including an output and operable to deliver timing pulses in said output; and an additional logic circuit including a first input connected to said outut of said timing pulse generator, a second output connected to said output of said counter, and an output connected to said first input of said counter.

4. The improved circuit arrangement of claim 1, wherein said other logic circuit further includes a third input for receiving first and second control signals.

5. The improved circuit arrangement of claim 4, comprising:

switch means operable to connect said first and second control signals to said third input of said other logic circuit.

* * * * *